(12) United States Patent
Imai et al.

(10) Patent No.: US 12,269,007 B2
(45) Date of Patent: *Apr. 8, 2025

(54) ACTIVATED CARBON FIBER SHEET FOR MOTOR VEHICLE CANISTER

(71) Applicant: NIPPON PAPER INDUSTRIES CO., LTD., Tokyo (JP)

(72) Inventors: Daisuke Imai, Tokyo (JP); Yoshihide Watanabe, Tokyo (JP); Yuu Takata, Tokyo (JP); Shunsuke Ozawa, Tokyo (JP); Chie Yoshida, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 469 days.

This patent is subject to a terminal disclaimer.

(21) Appl. No.: 17/667,064

(22) Filed: Feb. 8, 2022

(65) Prior Publication Data
US 2022/0152580 A1 May 19, 2022

Related U.S. Application Data

(63) Continuation of application No. PCT/JP2020/031503, filed on Aug. 20, 2020.

(30) Foreign Application Priority Data

Aug. 21, 2019 (JP) .................. 2019-151378

(51) Int. Cl.
*B01D 53/22* (2006.01)
*B01D 53/04* (2006.01)
(Continued)

(52) U.S. Cl.
CPC .......... *B01J 20/20* (2013.01); *B01D 53/0415* (2013.01); *B01J 20/28011* (2013.01);
(Continued)

(58) Field of Classification Search
CPC ............ B01J 20/28011; B01J 2220/66; B01J 20/28073; B01J 2220/42; B01J 20/20;
(Continued)

(56) References Cited

U.S. PATENT DOCUMENTS 6,099,609 A * 8/2000 Lira .................. F04D 29/281
55/467
11,642,433 B2 * 5/2023 Fujiki .................. B01J 20/28
422/122

(Continued)

FOREIGN PATENT DOCUMENTS

JP 55-107056 8/1980
JP 58-91360 5/1983
(Continued)

OTHER PUBLICATIONS

Superpose American Heritage Dictionary of the English Language, Fifth Edition. 2016 by Houghton Mifflin Harcourt Publishing Company. https://www.thefreedictionary.com/superposed (Year: 2016).*
(Continued)

*Primary Examiner* — Anthony R Shumate
(74) *Attorney, Agent, or Firm* — Wenderoth, Lind & Ponack, L.L.P.

(57) ABSTRACT

An object is to provide an adsorbent using activated carbon fiber, the adsorbent being suitable for motor vehicle canisters and enabling reduction in pressure loss.

An activated carbon fiber sheet for a motor vehicle canister fulfils the following conditions (1) to (4). (1) The sheet has a specific surface area ranging from 1100 to 2300 m²/g. (2) The sheet has a density ranging from 0.010 to 0.200 g/cm³ or less. (3) The sheet has a thickness ranging from 0.1 to 100.00 mm. (4) The sheet has a fiber size of 13.0 μm or larger.

12 Claims, 1 Drawing Sheet

(51) Int. Cl.
- *B01J 20/20* (2006.01)
- *B01J 20/28* (2006.01)
- *C01B 32/30* (2017.01)
- *D01F 9/16* (2006.01)
- *D06C 7/04* (2006.01)
- *F02M 25/08* (2006.01)

(52) U.S. Cl.
CPC ... *B01J 20/28035* (2013.01); *B01J 20/28066* (2013.01); *B01J 20/28071* (2013.01); *B01J 20/28073* (2013.01); *B01J 20/28076* (2013.01); *C01B 32/30* (2017.08); *D01F 9/16* (2013.01); *D06C 7/04* (2013.01); *B01D 2253/102* (2013.01); *B01D 2253/25* (2013.01); *B01D 2253/304* (2013.01); *B01D 2253/306* (2013.01); *B01D 2253/308* (2013.01); *B01D 2253/311* (2013.01); *B01D 2259/4516* (2013.01); *B01J 2220/42* (2013.01); *B01J 2220/66* (2013.01); *D10B 2401/10* (2013.01); *D10B 2505/12* (2013.01); *F02M 25/0854* (2013.01); *F02M 2200/9046* (2013.01)

(58) Field of Classification Search
CPC ............ B01J 20/28076; B01J 20/28066; B01J 20/28071; B01J 20/28035; B01D 2253/25; B01D 2253/304; B01D 2253/102; B01D 2253/306; B01D 53/0415; B01D 2253/308; B01D 2259/4516; B01D 2253/311; D06C 7/04; D01F 9/16; C01B 32/30

See application file for complete search history.

(56) References Cited

U.S. PATENT DOCUMENTS

| | | | |
|---|---|---|---|
| 2003/0032556 A1 | 2/2003 | Ouvry | |
| 2006/0141256 A1 | 6/2006 | Ishikawa et al. | |
| 2006/0145382 A1 | 7/2006 | Huang et al. | |
| 2007/0021300 A1 | 1/2007 | Farant | |
| 2009/0080142 A1 | 3/2009 | Nanba et al. | |
| 2009/0218292 A1* | 9/2009 | Mitchell | B01D 39/2062 210/694 |
| 2010/0212496 A1 | 8/2010 | Hanamoto et al. | |
| 2012/0063627 A1* | 3/2012 | Takashima | B01D 53/28 381/346 |
| 2015/0032069 A1* | 1/2015 | Ko | A61L 15/26 604/360 |
| 2016/0166802 A1* | 6/2016 | Ko | A61M 25/0017 604/544 |
| 2021/0198111 A1 | 7/2021 | Imai et al. | |
| 2022/0161229 A1* | 5/2022 | Imai | B01J 20/28083 |
| 2023/0390732 A1* | 12/2023 | Imai | B01J 20/28 |

FOREIGN PATENT DOCUMENTS

| | | | | |
|---|---|---|---|---|
| JP | 62152534 A * | 7/1987 | | |
| JP | 4-265461 | 9/1992 | | |
| JP | 5-103979 | 4/1993 | | |
| JP | 2007186403 A * | 7/2007 | ........... | C01B 32/342 |
| JP | 2013-173137 | 9/2013 | | |
| JP | WO2019/117029 | 6/2019 | | |
| TW | I276720 | 3/2007 | | |
| TW | 201932182 | 8/2019 | | |
| WO | 2004/099073 | 11/2004 | | |
| WO | 2004/110928 | 12/2004 | | |

OTHER PUBLICATIONS

JP-62152534-A Machine translation (Year: 1987).*
JP-2007186403-A Machine translation (Year: 2007).*
International Preliminary Report on Patentability issued on Feb. 17, 2022 in corresponding International (PCT) Patent Application No. PCT/JP2020/031503.
Extended European Search Report issued Dec. 11, 2023 in corresponding European Patent Application No. 20855575.5.
International Search Report issued Oct. 27, 2020 in International (PCT) Application No. PCT/JP2020/031503.
Written Opinion of the International Searching Authority issued Oct. 27, 2020 in International (PCT) Application No. PCT/JP2020/031503.
Office Action and Search Report issued May 7, 2021 in Taiwanese Application No. 109128122 with partial English translation.
Jo Anne G. Balanay, et al., "Morphologic and Surface Characterization of Different Types of Activated Carbon Fibres", Adsorption Science & Technology, 2012, vol. 30, No. 4, pp. 355-367.
International Search Report issued Nov. 10, 2022 in International (PCT) Application No. PCT/JP2020/031505.
Written Opinion of the International Searching Authority issued Nov. 10, 2020 in International (PCT) Application No. PCT/JP2020/031505.
Office Action issued Apr. 14, 2020 in Japanese Application No. 2020-004865 with English translation.
Office Action issued Aug. 18, 2020 in Japanese Application No. 2020-004865 with English translation.
Office Action and Search Report issued Mar. 18, 2021 in Taiwanese Application No. 109128123 with partial English translation.
Extended European Search Report issued Oct. 27, 2023 in European Patent Application No. 20853673.0.
International Preliminary Report on Patentability and Written Opinion of the International Searching Authority issued Feb. 17, 2022 in International (PCT) Application No. PCT/JP2020/031505.

* cited by examiner

ACTIVATED CARBON FIBER SHEET FOR MOTOR VEHICLE CANISTER

CROSS-REFERENCE TO RELATED APPLICATIONS

This application is based upon and claims the benefits of priorities from Japanese Patent Application No. 2019-151378, filed Aug. 21, 2019; and International Application No. PCT/JP2020/031503, filed Aug. 20, 2020, the entire contents of which are incorporated herein by reference.

TECHNICAL FIELD

The present invention relates to activated carbon fiber sheets, and particularly relates to activated carbon fiber sheets suitable for use in motor vehicle canisters and to methods of manufacturing the activated carbon fiber sheets.

BACKGROUND ART

Gasoline-powered vehicles release fuel vapor that has filled their fuel tanks due to pressure change in the fuel tanks with changes in outside air temperature, for example. The released fuel vapor is considered to be one of substances causing PM2.5 or photochemical smog. Canisters including adsorbents, such as activated carbon, have been provided to prevent the release of fuel vapor into the atmosphere. (Hereinafter, in this Description, a canister mounted in a motor vehicle may simply be referred to as a "motor vehicle canister" or more simply a "canister.")

With the recent increase in awareness for environmental conservation, gas emission regulations tend to be tightened year by year, and there is thus a demand for canisters to have higher adsorption performance. Furthermore, intake performance of motor vehicles tends to be reduced due to the spread of systems including start-stop systems, and gasoline adsorbed by adsorbents in their canisters thus tends to be difficult to be desorbed. Therefore, there is a demand for adsorbents used in canisters to have higher performance. Activated carbon is used as an adsorbent used in canisters, and has been proposed to be formed into granular shapes, powdery shapes, or honeycomb shapes (for example, Patent Literature 1).

CITATION LIST

Patent Literature

Patent Literature 1: Japanese Patent Application Laid-open No. 2013-173137

SUMMARY OF INVENTION

Technical Problem

Activated carbon fiber (or fibrous activated carbon) may be referred to as the third activated carbon in contrast with conventional powdered, granular, or pelletized activated carbon. Activated carbon fiber is said to be relatively large in specific surface area, large in adsorption capacity, and high in rate of adsorption and desorption, among different forms of activated carbon in a broad sense. However, activated carbon fiber has not been put to practical use in canisters, and research and development have not advanced sufficiently as to characteristics of activated carbon fiber suitable for practical use in canisters.

Aiming to put activated carbon fiber to practical use as adsorbents in motor vehicle canisters, the inventers have conducted diligent research and found that adsorbents need to be fixed such that the adsorbents are not worn away by vibration caused when the motor vehicles are driven and that sheets formed of activated carbon fiber are suitable for practical use in terms of ease of use, for example. However, the inventors have faced a problem that filling a chamber for storing an adsorbent with an activated carbon fiber sheet obtained by carbonization and activation without any space left in the chamber as conventionally done increases the pressure loss in the canister.

In view of the foregoing, one of objects to be solved by the present invention is to provide an adsorbent using activated carbon fiber, suitable for motor vehicle canisters, and enabling reduction in pressure loss.

Solution to Problem

As a result of conducting diligent study, the inventors have found that an adsorbent enabling improvement in gas permeability and reduction in pressure loss and suitable for motor vehicle canisters is able to be obtained by manufacturing an activated carbon fiber material using fiber having a fiber size larger than that of a conventional one, and the inventors have completed the present invention on the basis of these findings. The present invention can be understood in various aspects and includes the following, for example, as solutions to problems.

[1] An activated carbon fiber sheet for a motor vehicle canister, the activated carbon fiber sheet comprising:
a specific surface area ranging from 1100 to 2300 $m^2/g$;
a density ranging from 0.010 to 0.200 $g/cm^3$;
a thickness ranging from 0.10 to 100.00 mm; and
a fiber size of 13.0 μm or larger.

[2] The activated carbon fiber sheet for a motor vehicle canister, according to the above item [1], wherein the activated carbon fiber sheet has Frazier permeability of 150.0 $cm^3/cm^2/s$ or more.

[3] The activated carbon fiber sheet for a motor vehicle canister according to the above item [1] or [2], wherein the activated carbon fiber sheet has a total pore volume ranging from 0.50 to 1.20 $cm^3/g$.

[4] The activated carbon fiber sheet for a motor vehicle canister, according to any one of the above items [1] to [3], wherein the activated carbon fiber sheet has a pore volume ranging from 0.20 to 1.20 $cm^3/g$, the pore volume being a pore volume of pores having a pore size larger than 0.7 nm and equal to or smaller than 2.0 nm.

[5] The activated carbon fiber sheet for a motor vehicle canister, according to any one of the above items [1] to [4], wherein the activated carbon fiber sheet has a ratio $R_{0.7/2.0}$ equal to or more than 15% and less than 25%, the ratio $R_{0.7/2.0}$ being a ratio of a pore volume of pores having pore sizes of 0.7 nm or smaller to a pore volume of pores having pore sizes of 2.0 nm or smaller.

[6] An adsorptive layered product to be stored in an adsorbent chamber of a motor vehicle canister, the adsorptive layered product comprising:
a plurality of the activated carbon fiber sheets for a motor vehicle canister, according to any one of the above items [1] to [5], wherein
the plurality of the activated carbon fiber sheets having been superposed on one another.

[7] A motor vehicle canister, comprising:
the activated carbon fiber sheet for a motor vehicle canister, according to any one of the above items [1] to [5].
[8] The motor vehicle canister according to the above item [7], wherein
an adsorbent chamber of the motor vehicle canister has been filled with a layered product having a plurality of the activated carbon fiber sheets superposed on one another, and
the layered product is arranged such that a flow direction in which fluid passing through the layered product flows is approximately parallel to a major surface of the sheets.
[9] A method of producing an activated carbon fiber sheet for a motor vehicle canister, the method comprising:
carbonizing and activating a precursor fiber sheet holding one or both of a phosphoric acid-based catalyst and an organic sulfonic acid-based catalyst, wherein
the precursor fiber sheet includes cellulosic fiber having a fiber size of 4.0 dtex or larger.

Advantageous Effects of Invention

In one aspect of the present invention, an activated carbon fiber material suitable for a motor vehicle canister and enabling pressure loss to be reduced is able to be provided. Furthermore, in another aspect of the present invention, the activated carbon fiber sheet is easy to use and high in adsorption-desorption performance for a low concentration. In addition, in yet another aspect of the present invention, a motor vehicle canister excellent in adsorption-desorption performance for a low concentration is able to be provided.

BRIEF DESCRIPTION OF DRAWINGS

The FIGURE is a diagram schematically illustrating an embodiment of an adsorptive layered product formed of plural activated carbon fiber sheets superposed on one another, and an example of a flow direction of fluid that passes through the adsorptive layered product.

DESCRIPTION OF EMBODIMENTS

Figure 1:
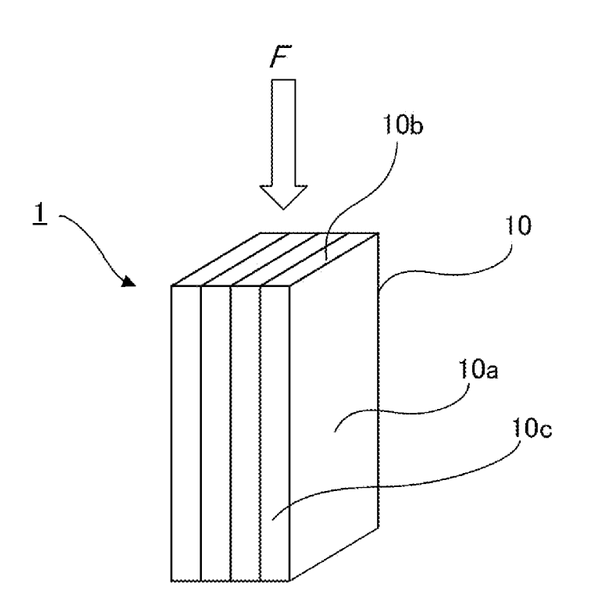

Embodiments of the present invention will be described hereinafter. The phrase, "ranging from AA to BB," related a numerical range means "being in the range of AA or more and BB or less" (where "AA" and "BB" represent any numerical values), unless otherwise specified. Furthermore, the units of the lower limit and the upper limit are the same as the unit written immediately after the upper limit (that is, "BB" herein), unless otherwise specified.

1. Activated Carbon Fiber Sheet for Motor Vehicle Canister

An activated carbon fiber sheet for a motor vehicle canister of the present invention is a product in the form of a sheet made of activated carbon fiber, and is suitably used as an adsorbent to be stored in a canister mounted in a motor vehicle. (Hereinafter, an activated carbon fiber sheet for a motor vehicle canister of the present invention may simply be referred to as an activated carbon fiber sheet of the present invention.)

In one embodiment of the present invention, an activated carbon fiber sheet preferably has given gas permeability. The gas permeability may be defined using Frazier permeability, for example.

The Frazier permeability may be measured at any thickness allowed by a measuring instrument, but in one embodiment of the present invention, for example, the Frazier permeability may be represented by a numerical value in a case where the sheet used to measure the Frazier permeability has a thickness ranging from 1 to 4 mm. "A case where the sheet has a thickness ranging from 1 to 4 mm" herein means a case where the Frazier permeability is measured using a test sample that is a sheet prepared to have a thickness ranging from 1 to 4 mm.

The lower limit of the Frazier permeability in any embodiment like the above embodiment may preferably be 100 $cm^3/cm^2/s$ or more, more preferably 120 $cm^3/cm^2/s$ or more, and even more preferably 130, 140, or 150 $cm^3/cm^2/s$ or more.

The upper limit of the Frazier permeability in any embodiment like the above embodiment may preferably be 300 $cm^3/cm^2/s$ or less, more preferably 290 $cm^3/cm^2/s$ or less, and even more preferably 280 $cm^3/cm^2/s$ or less.

The above lower limit or upper limit of the Frazier permeability preferable in the "case where the sheet has a thickness ranging from 1 to 4 mm" is not necessarily fulfilled over the entire range of thickness of 1 to 4 mm, and the above lower limit or upper limit is preferably fulfilled at at least one point in the range of thickness of 1 to 4 mm.

The Frazier permeability fulfilling the above lower limit enables reduction in pressure loss and provision of an adsorbent suitable for a motor vehicle canister. The Frazier permeability fulfilling the above upper limit, on the other hand, enables provision of an adsorbent sufficiently large in amount of adsorption-desorption.

A more preferable embodiment of the activated carbon fiber sheet of the present invention fulfills at least one or any two or more conditions of given items described below.

Specific Surface Area

The lower limit of specific surface area of the activated carbon fiber sheet of the present invention may preferably be 1100 $m^2/g$ or more, more preferably 1200 $m^2/g$ or more, and even more preferably 1300, 1400, 1500, 1600, 1700, or 1800 $m^2/g$ or more.

In general, the activated carbon fiber sheet of the present invention is preferably large in specific surface area in terms of adsorption performance, but the upper limit of specific surface area for the activated carbon fiber sheet may be approximately 2400, 2300, 2200, or 2100 $m^2/g$ or less.

Setting the specific surface area in the above range enables the sheet to have more excellent adsorption-desorption performance for fuel vapor. Furthermore, in one embodiment of the present invention, a comparatively large specific surface area is able to be maintained for an adsorbent material used in a canister as described above and pressure loss in the canister is able to be reduced.

Total Pore Volume

The lower limit of total pore volume of the activated carbon fiber sheet of the present invention may preferably be 0.50 $cm^3/g$ or more, more preferably 0.60 $cm^3/g$ or more, and even more preferably 0.70, 0.80, or 0.90 $cm^3/g$ or more.

The upper limit of total pore volume of the activated carbon fiber sheet of the present invention may preferably be 1.20 $cm^3/g$ or less, more preferably 1.10 $cm^3/g$ or less, and even more preferably 1.00 $cm^3/g$ or less.

Setting the total pore volume in the above range enables the sheet to have more excellent adsorption-desorption performance for fuel vapor.

Average Pore Size (Average Pore Diameter)

With respect to the present invention, the term, "pore size," means the diameter or width of a pore, rather than the radius of the pore, unless otherwise specified clearly.

The lower limit of average pore size of the activated carbon fiber sheet of the present invention may preferably be 1.69 nm or larger, more preferably 1.70 nm or larger, and even more preferably 1.72, 1.75, 1.78, or 1.80 nm or larger.

The upper limit of average pore size of the activated carbon fiber sheet of the present invention may be freely selected, but may preferably be 4.00 nm or smaller, more preferably 3.50 nm or smaller, and even more preferably 3.00 nm or smaller.

Setting the average pore size in the above range enables the sheet to have more excellent adsorption-desorption performance for fuel vapor.

Ultramicropore Volume: $V_{0.7}$

With respect to the present invention, the term, "ultramicropore" means a pore having a pore size of 0.7 nm or smaller.

The lower limit of ultramicropore volume of the activated carbon fiber sheet of the present invention may preferably be 0.05 cm$^3$/g or more, more preferably 0.10 cm$^3$/g or more, and even more preferably 0.12 or 0.14 cm$^3$/g or more.

The upper limit of ultramicropore volume of the activated carbon fiber sheet of the present invention may preferably be 0.30 cm$^3$/g or less, more preferably 0.29 cm$^3$/g or less, and even more preferably 0.26, 0.24, 0.22, or 0.20 cm$^3$/g or less.

Setting the ultramicropore volume in the above range enables the sheet to have more excellent adsorption-desorption performance for fuel vapor.

Micropore Volume: $V_{2.0}$

With respect to the present invention, the term "micropore" means a pore having a pore size of 2.0 nm or smaller.

The lower limit of micropore volume of the activated carbon fiber sheet of the present invention may preferably be 0.50 cm$^3$/g or more, more preferably 0.60 cm$^3$/g or more, and even more preferably 0.65 or 0.70 cm$^3$/g or more.

The upper limit of micropore volume of the activated carbon fiber sheet of the present invention may preferably be 1.00 cm$^3$/g or less, more preferably 0.90 cm$^3$/g or less, and even more preferably 0.80 cm$^3$/g or less.

Setting the micropore volume in the above range enables the sheet to have more excellent adsorption-desorption performance for fuel vapor.

Pore Volume of Pores Having Pore Size Larger Than 0.7 nm and Equal to or Smaller Than 2.0 nm: $V_{0.7\text{-}2.0}$ A pore volume $V_{0.7\text{-}2.0}$ of pores having pore sizes larger than 0.7 nm and equal to or smaller than 2.0 nm can be determined by Equation 1 below using a value, "a," of ultramicropore volume and a value, "b," of micropore volume.

$$V_{0.7\text{-}2.0} = b - a \quad \text{(Equation 1)}$$

The lower limit of the pore volume $V_{0.7\text{-}2.0}$ of the pores in the activated carbon fiber sheet of the present invention, the pores having the pore sizes larger than 0.7 nm and equal to or smaller than 2.0 nm, may preferably be 0.20 cm$^3$/g or more, more preferably 0.30 cm$^3$/g or more, and even more preferably 0.36, 0.40, 0.45, or 0.50 cm$^3$/g or more.

The upper limit of the pore volume $V_{0.7\text{-}2.0}$ of the pores in the activated carbon fiber sheet of the present invention, the pores having the pore sizes larger than 0.7 nm and equal to or smaller than 2.0 nm, may preferably be 1.20 cm$^3$/g or less, more preferably 1.00 cm$^3$/g or less, and even more preferably 0.90, 0.80, 0.75, 0.70, 0.65, or 0.60 cm$^3$/g or less.

Setting the pore volume $V_{0.7\text{-}2.0}$ in the above range enables the sheet to have more excellent adsorption-desorption performance for fuel vapor.

Ratio of Volume of Ultramicropores to Volume of Micropores: $R_{0.7/2.0}$

A ratio $R_{0.7/2.0}$ of the pore volume of the ultramicropores having pore sizes of 0.7 nm or smaller to the pore volume of the micropores having pore sizes of 2.0 nm or smaller can be determined by Equation 2 below using the value, "a," of the ultramicropore volume and the value, "b," of the micropore volume.

$$R_{0.7/2.0} = a/b \times 100(\%) \quad \text{(Equation 2)}$$

In the activated carbon fiber sheet of the present invention, the lower limit of the ratio $R_{0.7/2.0}$ of the ultramicropore volume to the micropore volume may preferably be 15.0% or more, more preferably 18% or more, and even more preferably 19% or more.

In the activated carbon fiber sheet of the present invention, the upper limit of the ratio $R_{0.7/2.0}$ of the ultramicropore volume to the micropore volume may preferably be 60% or less, more preferably 50% or less, and even more preferably 40, 30, or 25% or less.

Setting the ultramicropore volume ratio $R_{0.7/2.0}$ in the above range enables the sheet to have more excellent adsorption-desorption performance for fuel vapor.

Basis Weight (Weight Per Unit Area)

The lower limit of basis weight of the activated carbon fiber sheet of the present invention may preferably be 50.0 g/m$^2$ or more, more preferably 60.0 g/m$^2$ or more, and even more preferably 70.0 or 80.0 g/m$^2$ or more.

The upper limit of basis weight of the activated carbon fiber sheet of the present invention may preferably be 2000.0 g/m$^2$ or less, more preferably 1900.0 g/m$^2$ or less, and even more preferably 1800.0, 1700.0, 1600.0, or 1500.0 g/m$^2$ less.

Setting the basis weight in the above range enables the sheet to have more excellent adsorption-desorption performance demanded for use in a canister within a range of volume of adsorbent that is able to be stored in the canister.

Sheet Thickness

The lower limit of sheet thickness of the activated carbon fiber sheet of the present invention may preferably be 0.10 mm or larger, more preferably 0.50 mm or larger, and even more preferably 1.00, 1.50, 2.00, or 2.50 mm or larger.

The upper limit of sheet thickness of the activated carbon fiber sheet of the present invention may preferably be 100.00 mm or smaller, more preferably 70.00 mm or smaller, and even more preferably 50.00, 40.00, 30.00, 20.00, or 10.00 mm or smaller.

Setting the sheet thickness in the above range enables the sheet to have more excellent adsorption-desorption performance demanded for use in a canister within a range of volume of adsorbent that is able to be stored in the canister.

Sheet Density

The lower limit of sheet density of the activated carbon fiber sheet of the present invention may preferably be 0.010 g/cm$^3$ or more, more preferably 0.015 g/cm$^3$ or more, and even more preferably 0.020 g/cm$^3$ or more.

The upper limit of sheet density of the activated carbon fiber sheet of the present invention may preferably be 0.200 g/cm$^3$ or less, more preferably 0.100 g/cm$^3$ or less, and even more preferably 0.080 or 0.050 g/cm$^3$ or less.

Setting the sheet density in the above range enables the sheet to have more excellent adsorption-desorption performance per volume demanded for the canister within a range of volume of adsorbent that is able to be stored in the canister. Furthermore, by the sheet density being equal to or more than the above lower limit, mechanical properties (for example, strength) of the sheet are able to be prevented from being deteriorated. In addition, fulfilling the sheet density and other conditions including the sheet thickness enables reduction in pressure loss due to the activated carbon fiber sheet.

The sheet thickness and density of the activated carbon fiber sheet can be adjusted by: adjustment of the type of fiber in the precursor and/or the thickness and density of the raw material sheet; and/or a process of pressing the activated carbon fiber sheet, for example.

Fiber Size of Activated Carbon Fiber Sheet

The lower limit of fiber size forming the activated carbon fiber sheet of the present invention may preferably be 13.0 µm or larger, more preferably 14.0 µm or larger, and even more preferably 15.0, 16.0, 17.0, 18.0, 19.0, or 20.0 µm or larger.

The upper limit of fiber size forming the activated carbon fiber sheet of the present invention may be freely selected, but may be, for example, 60.0 µm or smaller, preferably 50.0 µm or smaller, and more preferably 45.0, 40.0, or 35.0 µm or smaller.

Setting the fiber size of the fiber forming the activated carbon fiber sheet in the above range makes the activated carbon fiber sheet enable pressure loss to be reduced.

Tensile Strength (MD: Machine Direction)

The lower limit of tensile strength (MD) of the activated carbon fiber sheet of the present invention may preferably be 0.005 kN/m or more, more preferably 0.007 kN/m or more, and even more preferably 0.009 kN/m or more.

The upper limit of tensile strength (MD) of the activated carbon fiber sheet of the present invention is not particularly limited and may be freely selected, but may preferably be 2.50 kN/m or less, more preferably 2.00 kN/m or less, and even more preferably 1.25, 1.00, 0.75, or 0.50 kN/m or less.

Setting the tensile strength (MD) in the above range enables the sheet to have flexibility. Therefore, an absorbent that has excellent workability, is difficult to be damaged, and is easy to use in operation including placement of the absorbent into a canister is able to be provided.

Tensile Strength (CD: Cross Direction)

The lower limit of tensile strength (CD) of the activated carbon fiber sheet of the present invention may preferably be 0.005 kN/m or more, more preferably 0.008 kN/m or more, and even more preferably 0.009 kN/m or more.

The upper limit of tensile strength (CD) of the activated carbon fiber sheet of the present invention is not particularly limited and may be freely selected, but may preferably be 2.50 kN/m or less, more preferably 2.00 kN/m or less, and even more preferably 1.25, 1.00, 0.75, or 0.50 kN/m or less.

Setting the tensile strength (CD) in the above range enables the sheet to have flexibility. Therefore, an absorbent that has excellent workability, is difficult to be damaged, and is easy to use in operation including placement of the absorbent into a canister is able to be provided.

Moisture Content

The activated carbon fiber sheet of the present invention preferably has a given moisture content. For example, the lower limit of moisture content at 23° C. and a relative humidity of 50% may preferably be 1.0% or more, more preferably 2.0% or more, and even more preferably 3.0% or more.

Furthermore, the upper limit of the moisture content at 23° C. and the relative humidity of 50% may preferably be 25.0% or less, more preferably 20.0% or less, and even more preferably 10.0 or 8.0% or less.

Setting the moisture content in the above range under the above conditions enables the sheet to be more excellent as an adsorbent for motor vehicle canisters.

Methylene Blue Adsorption Performance

The activated carbon fiber sheet of the present invention preferably has, as an adsorbent, given methylene blue adsorption performance. The methylene blue absorption performance can be represented as an amount of adsorbed methylene blue per activated carbon fiber sheet weight. The methylene blue adsorption performance of the activated carbon fiber sheet of the present invention may preferably be 100 ml/g or more, more preferably 150 ml/g or more, and even more preferably 200, 250, 280, or 300 ml/g or more.

N-Butane Adsorption-Desorption Performance

The activated carbon fiber sheet of the present invention preferably has, as an adsorbent, given n-butane adsorption-desorption performance. The n-butane adsorption-desorption performance serves as an index of adsorption-desorption performance for vapor and any adsorbent having excellent n-butane adsorption-desorption performance is thus suitable for use in motor vehicle canisters. The n-butane adsorption-desorption performance can be represented as an effective amount of adsorbed n-butane per activated carbon fiber sheet weight. This effective amount of adsorbed n-butane per activated carbon fiber sheet weight is an amount of adsorbed n-butane in adsorption that is repeated subsequently to desorption of n-butane from the adsorbent under predetermined desorption conditions after sufficient adsorption breakthrough of n-butane through the adsorbent.

A preferred embodiment of the activated carbon fiber sheet of the present invention has an effective adsorption-desorption amount of n-butane (a first adsorption amount) that may preferably be 8.00 wt % or more and more preferably 10.00 wt % or more. This effective adsorption-desorption amount of n-butane (the first adsorption amount) is determined according to a measurement method described with respect to Examples below.

A preferred embodiment of the activated carbon fiber sheet of the present invention has an effective adsorption-desorption amount of n-butane (an average of second adsorption amount and desorption amount) that may preferably be 6.00 wt % or more, more preferably 6.25 wt % or more, and even more preferably 6.50, 6.75, or 7.00 wt % or more. This effective adsorption-desorption amount of n-butane (the average of second adsorption amount and desorption amount) is determined according to a measurement method described with respect to Examples below.

Furthermore, a preferred embodiment of the activated carbon fiber sheet of the present invention has an effective adsorption-desorption ratio of n-butane that may preferably be 25.0% or more, more preferably 30.0% or more, and even more preferably 35.0, 40.0, or 45.0%. The effective adsorption-desorption ratio of n-butane is determined according to a measurement method described with respect to Examples below.

Combinations of Preferable Conditions

The activated carbon fiber sheet of the present invention enables reduction in pressure loss and may have, in one embodiment, given permeability (for example, Frazier permeability). Examples of a preferred embodiment of the present invention include an embodiment that further fulfills one or any two or more of the above described items related to the physical properties or performance. Examples of a preferred embodiment will be described below. The activated carbon fiber sheet of the present invention is not limited to the following examples of combinations.

Sheet of Embodiment 1

An activated carbon fiber sheet for a motor vehicle canister fulfilling the following conditions (1) to (4).

(1) The activated carbon fiber sheet has a specific surface area ranging from 1100 to 2300 m²/g.
(2) The activated carbon fiber sheet has a sheet density ranging from 0.010 to 0.200 g/cm³.
(3) The activated carbon fiber sheet has a sheet thickness ranging from 0.10 to 100.00 mm.
(4) The activated carbon fiber sheet has a fiber size of 13.0 μm or larger.

By fulfilling the above conditions for (1) specific surface area, (2) sheet density, (3) sheet thickness, and (4) fiber size, the activated carbon fiber sheet enables reduction in pressure loss.

2. Adsorptive Layered Product

An adsorptive layered product to be stored in an adsorbent chamber of a motor vehicle canister may be provided as another embodiment of the present invention. This adsorptive layered product is a layered product having a plurality of the activated carbon fiber sheets described above that have been superposed on one another.

The adsorptive layered product of the present invention preferably enables reduced pressure loss. The upper limit of pressure loss may preferably be 1.50 kPa or less, more preferably 1.20 kPa or less, and even more preferably 1.10, 1.00, 0.90, 0.80, or 0.70 kPa or less. This does not necessarily mean that the lower the pressure loss the better, and in terms of the adsorption performance for the intended purpose, the lower limit of pressure loss may preferably be 0.05 kPa or more, more preferably 0.10 kPa or more, and even more preferably 0.15 kPa or more.

The FIGURE illustrates an embodiment of the adsorptive layered product of the present invention. Dimensions, such as the length and thickness of the sheets are schematically illustrated and are not limited to this illustration. Furthermore, the number of sheets is four in the illustrated example, but is not limited to the illustrated example.

An adsorptive layered product 1 illustrated in the FIGURE is a layered product formed of four activated carbon fiber sheets 10 superposed on one another. Major surfaces 10a of the activated carbon fiber sheets 10 have been superposed on one another.

The adsorptive layered product 1 may be stored in a canister in any way. In a preferred embodiment, the adsorptive layered product 1 may be arranged such that the direction along which the sheets are high in tensile strength is along the flow of gas. In a more specific preferred embodiment, for example, the adsorptive layered product 1 is preferably arranged such that the major surfaces 10a of the activated carbon fiber sheets are not orthogonal to a flow direction in which fluid F, such as vapor, flows, and more preferably, as illustrated in the FIGURE, the adsorptive layered product 1 may be arranged such that the major surfaces a become approximately parallel to the flow direction of the fluid F, such as vapor. The arrangement to place the major surfaces a approximately parallel to the flow direction of the fluid F, such as vapor, places lateral end surfaces 10b of the plural activated carbon fiber sheets to be against the flow direction of the fluid F. This arrangement enables reduction in pressure loss. In the FIGURE, the lateral end surfaces 10b shorter in length are against the flow direction of the fluid F, but without being limited to this arrangement, longer lateral end surfaces 10c may be against the flow direction of the fluid F.

Furthermore, the overall shape of the adsorptive layered product may be cuboidal or cubical. In addition, the shape of the adsorptive layered product may be adapted to the shape of the adsorbent chamber in which the activated carbon fiber sheets are stored, or the activated carbon fiber sheets may be rolled to form the adsorptive layered product into a cylindrical shape. As described above, the activated carbon fiber sheet of the present invention is a material that is able to be processed or formed into various shapes easily and is very easy to use.

3. Canister

The activated carbon fiber sheet of the present invention is suitable as an adsorbent to be stored in a motor vehicle canister. That is, the present invention enables provision of a motor vehicle canister as another embodiment.

The motor vehicle canister of the present invention has the activated carbon fiber sheet installed therein as an adsorbent. The motor vehicle canister has a structure that is not particularly limited, and may have any common structure. For example, the motor vehicle canister may be a motor vehicle canister having the following structure.

A canister comprising:
- a housing;
- an adsorbent chamber in the housing and storing the adsorbent;
- a first opening to connect between the adsorbent chamber and an engine and allow gas to move between the adsorbent chamber and the engine;
- a second opening to connect between the adsorbent chamber and a fuel tank and allow gas to move between the adsorbent chamber and the fuel tank; and
- a third opening to open in response to application of a given pressure to the third opening from the adsorbent chamber or from outside air, connect between the adsorbent chamber and the outside air, and allow gas to move between the adsorbent chamber and the outside air.

The above described activated carbon fiber sheet of the present invention may be used as an absorbent in the canister of the present invention. As described above, because the activated carbon fiber sheet of the present invention enables reduction in pressure loss, even if the canister is filled with the activated carbon fiber sheet without space left in the canister, pressure loss is able to be reduced more than that in a case where a conventional activated carbon fiber sheet is used.

The first, second, and third openings are inlet-outlets through which gas is let in and let out. The arrangement of these openings that are inlet-outlets for gas is not particularly limited, but the third opening that is an inlet-output for the outside air is preferably placed at a position enabling gas to sufficiently pass through the adsorbent when the gas moves between: the third opening; and the first opening and/or second opening. For example, in an embodiment that may be adopted, the first and second openings are provided on a first lateral surface of the housing and the third opening is provided on a second lateral surface located opposite to the first lateral surface.

The adsorbent chamber may have more than one room. For example, the adsorbent chamber may be divided into two or more sections by a partition wall or partition walls. The partition walls to be used may be porous plates having gas permeability. Furthermore, an additional adsorbent chamber may be installed by provision of an external second housing separately from the first housing so that the first housing and the second housing are connected to each other via a gas passage. In a case where plural sections or housings are provided as described above, in a preferred embodiment, the adsorbent or the adsorbent chamber may be arranged so that adsorption capacities in these sections or housings sequentially decrease from one section or housing to another section or housing, from the first or second opening into which gas from the engine or the fuel tank flows, toward the third opening.

Specifically, for example, a composite canister that may be adopted has a main canister (a first housing) and a second canister (a second housing) that is provided additionally to the main canister and near the opening for the outside air. In this manner when plural sections or housings are provided as described above, a high performance canister can be provided with reduced cost. Such a high performance canister has: a main body (a first section or a first housing) with the largest storage capacity; and a second or later section or housing with a relatively smaller storage capacity. This main body is a section or housing where vapor from the engine or fuel tank first flows into and conventional and inexpensive activated carbon is to be stored. In the second or later section or housing, the active carbon fiber sheet of the present invention having excellent adsorption-desorption performance for a low concentration is stored.

When there is more than one adsorbent chamber, fuel vapor flowing from a preceding layer into an adsorbent chamber positioned downstream from the engine or fuel tank (that is, the adsorbent chamber positioned nearer to the inlet-outlet for outside air) has become lower in concentration. Therefore, the activated carbon fiber sheet of the present invention that has high n-butane adsorption performance for a low concentration of about 0.2% is suitable as an adsorbent to be stored in a second section or housing, or a more downstream adsorbent chamber. This second section or housing or the more downstream adsorbent chamber is positioned downstream from the engine or fuel tank. Furthermore, use of the activated carbon fiber sheet of the present invention in the adsorbent chamber nearer to the opening for outside air enables reduction in the amount of leakage of fuel vapor upon long-time stopping of the motor vehicle because the effective amount of adsorption-desorption by the activated carbon fiber sheet of the present invention through purging is large. In view of this effect also, the activated carbon fiber sheet of the present invention is suitable as an adsorbent to be used in a motor vehicle canister.

Therefore, preferred embodiments of the canister include, for example, the following embodiment.

A motor vehicle canister comprising:
two or more adsorbent chambers; and
the activated carbon fiber sheet of the present invention stored in a second or later adsorbent chamber arranged downstream from a first adsorbent chamber where gas from an engine or a fuel tank first flows into.

In the above described embodiment, the number of adsorbent chambers may be two or more. Furthermore, if the number of adsorbent chambers is three or more, the activated carbon fiber sheet of the present invention may be stored in at least one of the second and later adsorbent chambers.

4. Method of Manufacturing Activated Carbon Fiber Sheet

The activated carbon fiber sheet of the present invention can be manufactured by carbonizing and activating fiber having a given fiber size. The fiber before the carbonization and activation is referred to herein as precursor fiber and a sheet formed of the precursor fiber is referred to herein as a precursor fiber sheet. With respect to the present invention, the term, "fiber size," means the diameter or width of fiber, rather than the radius of the fiber, unless otherwise specified clearly. Furthermore, the term, "fiber size," is mainly used for fiber of an activated carbon sheet that has been carbonized and activated.

Examples of a preferred embodiment of a method of manufacturing the activated carbon fiber sheet of the present invention include the following method.

A method comprising:
carbonizing and activating a precursor fiber sheet holding one or both of a phosphoric acid-based catalyst and an organic sulfonic acid-based catalyst, wherein
the precursor fiber sheet includes cellulosic fiber having a fiber size ranging from 4.0 to 60.0 dtex.

The lower limit of the fiber size (fineness) of the fiber serving as a precursor may preferably be 4.0 dtex or more, more preferably 5.0 dtex or more, and even more preferably 8.0, 10.0, 12.0, or 15.0 dtex or more.

The upper limit of the fiber size (fineness) of the fiber serving as the precursor may preferably be 60.0 dtex or less, more preferably 50.0 dtex or less, and even more preferably 40.0 or 30.0 dtex or less.

Setting the fiber size of the fiber serving as the precursor in the above range makes the activated carbon fiber sheet to enable reduction in pressure loss.

The method of manufacturing the activated carbon fiber sheet of the present invention may be implemented by reference to the following information.

4-1. Preparation of Raw Material Sheet (Precursor Fiber Sheet)

Types of Fiber

Examples of fiber forming a raw material sheet may include cellulosic fiber, pitch-based fiber, PAN-based fiber, phenol resin-based fiber, and preferably include cellulosic fiber.

Cellulosic Fiber

The cellulosic fiber refers to fiber composed mainly of cellulose and/or a derivative thereof. Origins of cellulose and cellulose derivatives may be any one or more of examples including chemically synthesized products, plant derived cellulose, regenerated cellulose, and cellulose produced by bacteria. Examples of the cellulosic fiber preferably used may include: fiber formed of a plant cellulose material obtained from plants, such as trees; and fiber formed of a long fibrous regenerated cellulose material obtained by dissolution of a plant cellulose material (such as cotton or pulp) through chemical treatment. The fiber may contain components, such as lignin and/or hemicellulose.

Examples of raw materials for the cellulosic fiber (the plant cellulose material or regenerated cellulose material) may include: plant cellulose fiber, such as cotton (such as short fiber cotton, medium fiber cotton, long fiber cotton, super long cotton, and ultra super long cotton), hemp, bamboo, kozo, mitsumata, banana, and tunicates; regenerated cellulose fiber, such as cuprammonium rayon, viscose rayon, polynosic rayon, and cellulose made from bamboo; purified cellulose fiber spun using organic solvent (N-methylmorpholine N-oxide); and acetate fiber, such as diacetate and triacetate. In terms of availability, a preferred one or preferred ones of these examples is/are at least one selected from cuprammonium rayon, viscose rayon, and purified cellulose fiber.

Embodiments of the cellulosic fiber are not particularly limited, and correspondingly to a purpose, the cellulosic fiber prepared into a form, such as raw yarn (unprocessed yarn), false twisted yarn, dyed yarn, single yarn, folded yarn, or covering yarn, can be used. When the cellulosic fiber includes two or more kinds of raw materials, the cellulosic fiber may be, for example, blended yarn or blended twisted yarn. Furthermore, the above-mentioned raw materials in various forms may be used, alone or in combination of two or more, as the cellulosic fiber. Non-twisted yarn is preferred among the above-mentioned raw materials for both moldability and mechanical strength of the composite material.

Fiber Sheet

A fiber sheet refers to a sheet obtained by processing a large number of filaments of fiber into a thin and wide sheet. Fiber sheets include woven fabric, knitted fabric, and nonwoven fabric.

Methods of weaving the cellulosic fiber are not particularly limited, and any common method can be used. Weaves of the woven fabric are not particularly limited either, and any of three foundation weaves that are a plain weave, a twill weave, and a satin weave may be used.

Spaces between warp yarns and between weft yarns of the cellulosic fiber in the woven fabric formed of the cellulosic fiber may range preferably from 0.1 to 0.8 mm, more preferably from 0.2 to 0.6 mm, and even more preferably from 0.25 to 0.5 mm. Furthermore, the woven fabric formed of the cellulosic fiber may have a mass per unit area ranging preferably from 50 to 500 $g/m^2$ and more preferably from 100 to 400 $g/m^2$.

Setting the spaces and the mass per unit area of the cellulosic fiber and the woven fabric formed of the cellulosic fiber in the above ranges enables carbon fiber woven fabric obtained by heat treatment of the woven fabric to have excellent strength.

Methods of manufacturing the nonwoven fabric are also not particularly limited. Examples of the methods may include: a method where a fiber sheet is obtained using a dry method or a wet method, with the above-mentioned fiber serving as a raw material and having been cut into appropriate lengths; and a method where a fiber sheet is directly obtained from a solution using an electrospinning method. After the nonwoven fabric is obtained, treatment, such as resin bonding, thermal bonding, spun lacing, or needle punching, may be added for the purpose of bonding the filaments of fiber together.

4-2. Catalyst

In Manufacturing Method Embodiment 1, a catalyst is held by the raw material sheet prepared as described above. The raw material sheet holding the catalyst is carbonized and further activated by using gas, such as steam, carbon dioxide, or air gas, and a porous activated carbon fiber sheet is thereby able to be obtained. Examples of the catalyst that may be used include a phosphoric acid-based catalyst and an organic sulfonic acid-based catalyst.

Phosphoric Acid-Based Catalyst

Examples of the phosphoric acid-based catalyst may include: oxyacids of phosphorus, such as phosphoric acid, metaphosphoric acid, pyrophosphoric acid, phosphorous acid, phosphoric acid, phosphorous acid, and phosphinic acid; ammonium dihydrogen phosphate, diammonium hydrogen phosphate, triammonium phosphate, dimethyl phosphono propanamide, ammonium polyphosphate, and polyphosphonitrile chloride; and condensation products between: phosphoric acid, tetrakis (hydroxymethyl) phosphonium salt, or tris (1-aziridinyl) phosphine oxide; and urea, thiourea, melamine, guanine, cyanamide, hydrazine, dicyandiamide, or a methylol derivative of any one of these. Preferable examples may include diammonium hydrogen phosphate. One kind of phosphoric acid-based catalysts may be used alone or two or more kinds of phosphoric acid-based catalysts may be used in combination. When the phosphoric acid-based catalyst is used in the form of an aqueous solution, the phosphoric acid-based catalyst in the aqueous solution may have a concentration ranging preferably from 0.05 to 2.0 mol/L and more preferably from 0.1 to 1.0 mol/L.

Organic Sulfonic Acid-Based Catalyst

An organic compound having one or more sulfo groups can be used as the organic sulfonic acid. For example, a compound in which a sulfo group is bonded to any of various carbon skeletons of aliphatic series or aromatic series can be used. A preferred organic sulfonic acid-based catalyst has a low molecular weight in terms of handling of the catalyst.

Examples of the organic sulfonic acid-based catalyst may include compounds represented by $R—SO_3H$ where: R is a linear or branched alkyl group having 1 to 20 carbon atoms, a cycloalkyl group having 3 to 20 carbon atoms, or an aryl group having 6 to 20 carbon atoms; and each of the alkyl group, the cycloalkyl group and the aryl group optionally has a substituent of an alkyl group, a hydroxyl group, or a halogen group. Examples of the organic sulfonic acid-based catalyst may include methanesulfonic acid, ethanesulfonic acid, propanesulfonic acid, 1-hexanesulfonic acid, vinylsulfonic acid, cyclohexanesulfonic acid, p-toluenesulfonic acid, p-phenolsulfonic acid, naphthalenesulfonic acid, benzenesulfonic acid, and camphorsulfonic acid. Of these examples, methanesulfonic acid may be preferably used. Furthermore, one kind of these organic sulfonic acid-based catalysts may be used alone, or two or more kinds of these organic sulfonic acid-based catalysts may be used in combination.

When the organic sulfonic acid is used in the form of an aqueous solution, the organic sulfonic acid in the aqueous solution may have a concentration ranging preferably from 0.05 to 2.0 mol/L and more preferably from 0.1 to 1.0 mol/L.

Mixed Catalyst

The above-mentioned phosphoric acid-based catalyst and organic sulfonic acid-based catalyst may be mixed and used as a mixed catalyst. The mixing ratio may be adjusted as appropriate.

Holding of Catalyst

The catalyst is held by the raw material sheet. "Being held" means that the catalyst is kept in contact with the raw material sheet, and the catalyst may be held in any of various forms through, for example, adhesion, adsorption, or impregnation. Methods for the catalyst to be held by the raw material sheet are not particularly limited and may include, for example, a method of immersing the raw material sheet in an aqueous solution containing the catalyst, a method of sprinkling an aqueous solution containing the catalyst over the raw material sheet, a method of causing the raw material sheet to be in contact with vapor that is the catalyst that has been vaporized, and a method of mixing the fiber of the raw material sheet into an aqueous solution containing the catalyst to make paper.

A method that can be preferably used for sufficient carbonization is a method of immersing the raw material sheet in an aqueous solution containing the catalyst to impregnate the fiber with the catalyst such that the catalyst reaches the inside of the fiber. The temperature for the immersion in the aqueous solution containing the catalyst is not particularly limited and may preferably be room temperature. The immersion time ranges preferably from 10 seconds to 120 minutes and more preferably from 20 seconds to 30 minutes. The immersion allows the fiber forming the raw material sheet to adsorb, for example, 1 to 150% by mass and preferably 5 to 60% by mass, of the catalyst. After the immersion, the raw material sheet is preferably taken out from the aqueous solution and dried. A method of drying the raw material sheet may be, for example, any of methods including a method of leaving the raw material sheet at room temperature or putting the raw material sheet in a dryer. The drying may be performed until the sample no longer changes in weight by evaporation of excess moisture after the sample is removed from the aqueous solution containing the catalyst. For example, in the drying at room temperature, the drying time for which the raw material sheet is left may be 0.5 days or more. When the raw material sheet holding the catalyst almost no longer changes in mass because of the drying, a process of carbonizing the raw material sheet holding the catalyst is performed.

4-3. Carbonization

After being prepared, the raw material sheet holding the catalyst is subjected to carbonization treatment. The carbonization treatment for obtaining the activated carbon fiber sheet can be performed according to a common method of carbonizing activated carbon. A preferred embodiment of the carbonization treatment may be performed as follows.

The carbonization treatment is usually performed under an inert gas atmosphere. According to the present invention, the inert gas atmosphere means an oxygen-free or low-oxygen atmosphere in which carbon is difficult to undergo a combustion reaction and is thus carbonized. The inert gas atmosphere may preferably be an atmosphere including gas, such as argon gas or nitrogen gas, for example.

The raw material sheet holding the catalyst is subjected to heat treatment and carbonized in the given gas atmosphere mentioned above.

The lower limit of the heating temperature may be preferably 300° C. or higher, more preferably 350° C. or higher, and even more preferably 400° C. or higher or 750° C. or higher.

The upper limit of the heating temperature may be preferably 1400° C. or lower, more preferably 1300° C. or lower, and even more preferably 1200° C. or lower or 1000° C. or lower.

Setting the heating temperature as described above enables obtainment of a carbon fiber sheet with its fiber form maintained. If the heating temperature is lower than the above-mentioned lower limit, the carbon fiber may have a carbon content of 80% or less and carbonization thus tends to be insufficient.

The lower limit of the heat treatment time including the time for the temperature to rise may be preferably 10 minutes or more, more preferably 11 minutes or more, even more preferably 12 minutes or more, and still even more preferably 30 minutes or more.

The upper limit of the heat treatment time may be freely selected, but may be preferably 180 minutes or less, more preferably 160 minutes, and even more preferably 140 minutes or less.

Sufficiently impregnating the raw material sheet with the catalyst, setting the above-mentioned suitable heating temperature, and adjusting the heat treatment time enable adjustment of the degree of progress of pore formation and thus enable adjustment of the physical properties of the porous body, such as the specific surface area, the volume of the various pores, and the average pore diameter.

If the heat treatment time is less than the above lower limit, carbonization tends to be insufficient.

Furthermore, the heat treatment can include further reheating treatment in a given gas atmosphere after the above-described heat treatment (which may be referred to as primary heat treatment). That is, the carbonization treatment may be performed by dividing the heat treatment into two or more stages having different conditions, such as temperature conditions. Performing the primary heat treatment and the reheating treatment under predetermined conditions may enable adjustment of the physical properties, promotion of the carbonization and the subsequent activation, and thus obtainment of an activated carbon fiber sheet having excellent adsorption and desorption properties.

4-4. Activation Treatment

The activation treatment according to the present invention can be, for example, performed continuously after the above-described heat treatment, by providing steam and keeping an appropriate activation temperature for a predetermined time, and enables obtainment of the activated carbon fiber sheet.

The lower limit of the activation temperature may be preferably 300° C. or higher, more preferably 350° C. or higher, and even more preferably 400 or 750° C. or higher.

The upper limit of the activation temperature, on the other hand, may be preferably 1400° C. or lower, more preferably 1300° C. or lower, and even more preferably 1200 or 1000° C. or lower.

When the activation treatment is performed continuously after the heat treatment, the activation temperature is preferably adjusted to a temperature that is almost the same as the heating temperature.

The lower limit of the activation time may be preferably one minute or more, and more preferably five minutes or more.

The upper limit of the activation time may be freely selected, but may be preferably 180 minutes or less, more preferably 160 minutes or less, and even more preferably 140 minutes or less, 100 minutes or less, 50 minutes or less, or 30 minutes or less.

EXAMPLES

The present invention will hereinafter be described more specifically by reference to Examples, but the technical scope of the present invention is not limited to Examples described below.

Various items related to physical properties and performance of activated carbon fiber sheets and granular activated carbon were measured and evaluated by methods described below. Various numerical values defining the present invention can be determined by the following measurement methods and evaluation methods.

Fiber Size

The fiber size was determined from an average value, by randomly sampling ten filaments of fiber from an image with a magnification of 500 and measuring the ten filaments of fiber sampled using a scanning electron microscope, JSM-IT300 InTouchScope (manufactured by JEOL Ltd.).

Specific Surface Area

About 30 mg of an activated carbon fiber sheet were collected, vacuum-dried at 200° C. for 20 hours, weighed, and measured using a high-precision gas/vapor adsorption amount measuring apparatus, BELSORP-MAX II (MicrotracBEL Corp.). The adsorption amount of nitrogen gas at the boiling point of liquid nitrogen (77 K) was measured at a relative pressure ranging from the $10^{-8}$ order to 0.990, and an adsorption isotherm of the sample was thereby prepared. This adsorption isotherm was analyzed by the BET method for which the relative pressure range for analysis had been automatically determined under the conditions of the adsorption isotherm of Type I (ISO 9277), and the BET specific surface area per weight (unit: $m^2/g$) was determined as a specific surface area (unit: $m^2/g$).

Total Pore Volume

The total pore volume (unit: $cm^3/g$) by a one-point method was calculated on the basis of the result at the relative pressure of 0.990 on the adsorption isotherm obtained according to the above description related to the specific surface area.

Average Pore Size (Average Pore Diameter)

Calculation was performed using Equation 3 below.

$$\text{Average pore diameter (unit: nm)} = 4 \times \text{total pore volume} \times 10^3 \div \text{specific surface area} \quad \text{(Equation 3)}$$

Ultramicropore Volume

The adsorption isotherm obtained according to the above description related to the specific surface area was analyzed using the analysis software, BELMaster, pertaining to the high-precision gas/vapor adsorption amount measuring apparatus, BELSORP-MAX II (MicrotracBEL Corp.), through the GCMC method with the analysis settings set as follows: "Smoothing (moving average processing using one point each before and after every analyzed point of the pore distribution)," "Distribution function: No-assumption," "Definition of pore size: Solid and Fluid Def. Pore Size," and "Kernel: Slit-C-Adsorption." The integrated pore volume at 0.7 nm was read from the obtained pore distribution curve for adsorption, the integrated pore volume serving as the ultramicropore volume (unit: $cm^3/g$).

Micropore Volume

The adsorption isotherm obtained according to the above description related to the specific surface area was analyzed using the analysis software, BELMaster, pertaining to the high-precision gas/vapor adsorption amount measuring apparatus, BELSORP-MAX II (MicrotracBEL Corp.), through the GCMC method with the analysis settings set as follows: "Smoothing (moving average processing using one point each before and after every analyzed point of the pore distribution)," "Distribution function: No-assumption," "Definition of pore size: Solid and Fluid Def. Pore Size," and "Kernel: Slit-C-Adsorption." The integrated pore volume at 2.0 nm was read from the obtained pore distribution curve for adsorption, the integrated pore volume serving as the micropore volume (unit: $cm^3/g$).

Basis Weight of Sheet

After the activated carbon fiber sheet was allowed to stand for 12 hours or more under the environment where the temperature was 23±2° C. and the relative humidity was 50±5%, the basis weight (unit: $g/m^2$) of the sheet was determined from the weight and the lengthwise and widthwise dimensions of the sheet.

Sheet Thickness

The activated carbon fiber sheet was allowed to stand for 12 hours or more under the environment where the temperature was 23±2° C. and the relative humidity was 50±5%, and the thickness (unit: mm) of the sheet was then measured using a small digital thickness measuring device, FS-60DS (Daiei Kagaku Seiki Mfg. Co., Ltd.), with a load of 0.3 kPa applied to the sheet.

Density of Sheet

Calculation was performed using Equation 4 below.

$$\text{Sheet density (unit: } g/cm^3) = \text{basis weight of sheet} \div \text{sheet thickness} \div 10^3 \quad \text{(Equation 4)}$$

Tensile Strength (MD) and Tensile Strength (CD)

A sample was allowed to stand for 12 hours or more under the environment where the temperature was 23±2° C. and the relative humidity was 50±5%. Test pieces (each with a width of 15 mm and a length of 50 to 60 mm) were then cut out from the sheet along Machine Direction (MD) or Cross Direction (CD) orthogonal to Machine Direction (MD) so that lengths of the test pieces were respectively along Machine Direction and along Cross Direction. Using a Tensilon universal testing instrument RTG-1210 (A & D Co. Ltd.), the test pieces were pulled with the length between grips at 40 mm and the pulling speed at 100 mm/min. The tensile strength was calculated by Equation 5 below.

$$\text{Tensile strength (unit: kN/m)} = \text{maximum load (unit: N) applied during test} \div 15 \text{ mm} \quad \text{(Equation 5)}$$

Moisture Content

The activated carbon fiber sheet was allowed to stand for 12 hours or more under the environment where the temperature was 23±2° C. and the relative humidity was 50±5%, a sample of 0.5 to 1.0 g was thereafter collected from the sheet and dried at 115±5° C. for three hours or more in a dryer, and moisture (unit: %) was determined from change in weight of the dried sample.

Methylene Blue Adsorption Performance

Measurement according to methylene blue decolorizing power (unit: ml/g) of powdered activated carbon for water supply conforming to Japan Water Works Association standards (JWWA K113) was performed, and results of the measurement were determined as the methylene blue adsorption performance (unit: ml/g).

Frazier Permeability

Measurement was performed using Frazier Permeameter Model FP2 (Toyo Seiki Seisaku-sho, Ltd.) according to the A-method for permeability of testing methods for woven and knitted fabrics conforming to Japanese Industrial Standards (JIS L1096: 2010), and results of the measurement were determined as the Frazier permeability ($cm^3/cm^2/s$).

N-Butane Adsorption-Desorption Performance

The concentration and flow rate of n-butane and the flow rate of air for desorption were independently set to perform tests by reference to Standard Test Method for Determination of Butane Working Capacity of Activated Carbon (ASTM D5228-16) of the American Society for Testing and Materials Standards.

An adsorbent sample was dried at 115±5° C. for 3 hours or more in a dryer and the dry weight of the dried adsorbent sample was measured after the dried adsorbent sample was cooled. After the mass of an empty test tube (a glass tube having an inner diameter of 1.47 cm, a cross-sectional area of 1.67 $cm^2$, a length to be filled with the sample of 10 cm, and a volume to be filled with the sample of 16.7 ml) was measured, the adsorption tube was filled with 16.7 ml of the adsorbent sample. For example, the activated carbon fiber sheet was cut to obtain a sheet having a size of 16.7 ml=sheet thickness×length of 10 cm×width and the test tube was filled with the sheet that has been rolled up.

Subsequently, the test tube was installed into a flow apparatus and n-butane gas diluted with air to a concentration of 0.2% was fed into the test tube at 500 ml/min and a test temperature of 25° C. to cause adsorption of n-butane. The test tube was removed from the flow apparatus and the mass of the test tube removed was measured. This feeding of the 0.2% n-butane gas was repeated until constant mass was achieved, that is, until the amount of adsorption was saturated.

The test tube was reinstalled into the flow apparatus and air was fed into the test tube at a test temperature of 25° C. for three minutes and 48 seconds at 4.0 L/min to cause desorption of n-butane. The test tube was removed from the flow apparatus and the mass of the test tube removed was measured.

These adsorption and desorption processes were repeated so as to be performed twice in total, and the first adsorption amount, the effective adsorption-desorption amount, and the effective adsorption-desorption ratio were calculated using Equations 6, 7, and 8 below.

First adsorption amount=first amount of n-butane adsorbed÷dry weight of adsorbent sample×100 (Equation 6)

The units of the numerical values are as follows.
First adsorption amount (unit: wt %)
First amount of n-butane adsorbed (unit: g)
Dry weight of adsorbent sample (unit: g)

Effective adsorption-desorption amount={second amount of n-butane adsorbed+second amount of n-butane desorbed}÷2÷dry weight of adsorbent sample×100 (Equation 7)

The units of the numerical values are as follows.
Effective adsorption-desorption amount (unit: wt %)
Second amount of n-butane adsorbed (unit: g)
Second amount of n-butane desorbed (unit: g)
Dry weight of adsorbent sample (unit: g)

Effective adsorption-desorption ratio=effective adsorption-desorption amount÷first adsorption amount×100 (Equation 10)

The units of the numerical values are as follows.
Effective adsorption-desorption ratio (unit: %)
Effective adsorption-desorption amount (unit: wt %)
First adsorption amount (Unit: wt %)

Example 1

A needle-punched nonwoven fabric made of rayon fiber (at 17.0 dtex, having a fiber length of 76 mm) and having a basis weight of 300 g/m² was impregnated with 6 to 10% diammonium hydrogen phosphate aqueous solution, wrung out, and dried, to have 8 to 10% by weight of diammonium hydrogen phosphate attached to the nonwoven fabric. The obtained pretreated nonwoven fabric was heated in a nitrogen atmosphere to 900° C. in 50 minutes, and was kept at this temperature for four minutes. Continuously at that temperature, activation treatment was performed for 18 minutes in a nitrogen gas stream containing steam with a dew point of 71° C.

Example 2

An activated carbon fiber sheet of Example 2 was prepared in the same manner as Example 1, except that a needle-punched nonwoven fabric made of rayon fiber (at 7.8 dtex, having a fiber length of 51 mm) and having a basis weight of 300 g/m² was used in Example 2.

Example 3

A needle-punched nonwoven fabric made of rayon fiber (at 17.0 dtex, having a fiber length of 76 mm) and having a basis weight of 300 g/m² was impregnated with 4 to 8% methanesulfonic acid aqueous solution, wrung out, and dried, to have 6 to 8% by weight of methanesulfonic acid attached to the nonwoven fabric. The obtained pretreated nonwoven fabric was heated in a nitrogen atmosphere to 900° C. in 40 minutes, and was kept at this temperature for three minutes. Continuously at that temperature, activation treatment was performed for 16 minutes in a nitrogen gas stream containing steam with a dew point of 71° C.

Comparative Example 1

A needle-punched nonwoven fabric made of rayon fiber (at 3.3 dtex, having a fiber length of 76 mm) and having a basis weight of 300 g/m² was impregnated with 6 to 10% diammonium hydrogenphosphate aqueous solution, wrung out, and dried, to have 8 to 10% by weight of diammonium hydrogenphosphate attached to the nonwoven fabric. The obtained pretreated nonwoven fabric was heated in a nitrogen atmosphere to 900° C. in 50 minutes, and continuously at that temperature, activation treatment was performed for 13 minutes in a nitrogen gas stream containing steam with a dew point of 60° C.

Comparative Example 2

An activated carbon fiber sheet of Comparative Example 2 was prepared in the same manner as Comparative Example 1, except that a needle-punched nonwoven fabric made of rayon fiber (at 1.7 dtex, having a fiber length of 40 mm) and having a basis weight of 300 g/m² was used in Comparative Example 2.

Comparative Example 3: Granular Activated Carbon

Granular activated carbon filling a commercially available canister was taken out and used as an adsorbent of Comparative Example 2. The commercially available canister used was a canister having a product number of 14950-01FOA (Nissan Motor Co., Ltd.).

Results of measurement of the physical properties and performance for Examples 1 and 2 and Comparative Examples 1 to 3 are listed in Table 1.

TABLE 1

Measurement Results

| | | | Example 1 ACF sheet | Example 2 ACF sheet | Example 3 ACF sheet | Comparative Example 1 ACF sheet | Comparative Example 2 ACF sheet | Comparative Example 3 Granular activated carbon | Reference standard Analysis method |
|---|---|---|---|---|---|---|---|---|---|
| | Precursor fineness | dtex | 17 | 7.8 | 17 | 3.3 | 1.7 | — | |
| | ACF fiber size | μm | 28.3 | 19.4 | 30.8 | 12.5 | 8.2 | — | |
| $N_2$ adsorption BET analysis | Specific surface area | m²/g | 2090 | 1870 | 1290 | 1680 | 1730 | 1460 | JIS K 1477 Basic physical properties related to adsorption performance |
| | Total pore volume | cm³/g | 0.97 | 0.84 | 0.55 | 0.73 | 0.75 | 1.05 | |
| | Average pore diamter | nm | 1.85 | 1.80 | 1.71 | 1.74 | 1.74 | 2.88 | |

TABLE 1-continued

Measurement Results

| Item | | | Example 1 ACF sheet | Example 2 ACF sheet | Example 3 ACF sheet | Comparative Example 1 ACF sheet | Comparative Example 2 ACF sheet | Comparative Example 3 Granular activated carbon | Reference standard Analysis method |
|---|---|---|---|---|---|---|---|---|---|
| $N_2$ adsorption GCMC analysis | a) Ultramicropore volume[1] | $cm^3/g$ | 0.15 | 0.16 | 0.32 | 0.25 | 0.24 | 0.13 | Simulation analysis, Grand Canonical Monte Carlo method |
| | b) Micropore volume[2] | $cm^3/lg$ | 0.75 | 0.68 | 0.51 | 0.65 | 0.67 | 0.48 | |
| | b)-a) | $cm^3/g$ | 0.59 | 0.52 | 0.19 | 0.40 | 0.42 | 0.35 | |
| | a)/b) | % | 20.8 | 23.1 | 63.1 | 38.3 | 36.8 | 26.2 | |
| Physical properties of sheet | Basis weight | $g/m^2$ | 84.6 | 96.3 | 141.3 | 122.6 | 108.1 | — | |
| | Thickness | mm | 2.69 | 2.68 | 3.23 | 2.22 | 1.67 | — | Pressed and measured at 0.3 kPa |
| | Density | $g/cm^3$ | 0.031 | 0.036 | 0.044 | 0.055 | 0.065 | 0.47 | |
| Physical properties of sheets | Tensile strength MD | kN/m | 0.05 | 0.09 | 0.06 | 0.21 | 0.25 | — | |
| | Tensile strength CD | | 0.01 | 0.03 | 0.01 | 0.18 | 0.07 | — | |
| Moisture (at 23° C., RH of 50%) | | % | 4.0 | 4.1 | 10.7 | 11.5 | 9.3 | 27.5 | JIS K 1477 |
| Methylene blue adsorption performance | | ml/g | 330 | 300 | 100 | 200 | 120 | 0 | JIS K 1477, JWWA K 113 |
| Frazier permeability | | $cm^3/cm^2/s$ | 211 | 151 | 195 | 58 | 28 | — | |
| 0.2% N-butane adsorption-desorption performance | First adsorption amount | wt % | 14.50 | 14.71 | 17,32 | 14.64 | 14.84 | 4.81 | |
| | Effective adsorption-desorption amount[3] | | 8.77 | 7.25 | 6.54 | 5.70 | 5.37 | 1.20 | |
| | Effective adsorption-desorption ratio[4] | % | 60.5 | 49.3 | 37.7 | 38.9 | 36.2 | 24.9 | |

[1] Pore size of 0.7 nm or smaller
[2] Pore size of 2.0 nm or smaller
[3] Average of second adsorption amount and second desorption amount
[4] (Effective adsorption-desorption amount/first adsorption amount) × 100 (%)

Layered products were respectively prepared by superposing the activated carbon fiber sheets of Examples 1 and 2 and Comparative Examples 1 and 2. The granular activated carbon of Comparative Example 3 was used as is.

A frame body (a frame container) that is a cubical container and has one side and a side opposite to that one side that are open to allow ventilation therethrough was prepared as a container to store a layered product. Each side of the frame container prepared was 3.8 cm in length and 3.8 cm in width.

The frame container was filled with the layered product prepared or the granular activated carbon so that the layered product or the granular activated carbon was fitted to the size of the frame container and the filled framed container served as a test sample for measurement of pressure loss. Dimensions of each frame container are listed in Table 2.

The pressure loss was measured as follows. Air was fed to the test samples prepared as described above at 60 L/min, differential pressures between entrances and exits of the test samples were measured using a differential pressure meter, testo 510 (Testo K.K.), and determined as pressure losses (kPa).

The results of measurement of pressure loss are listed in Table 2.

TABLE 2

Pressure Loss Measurement Results

| Form of filling | Filling | | Layered product of sheets Example 1 | Layered product of sheets Example 2 | Layered product of sheets Example 3 | Layered product of sheets Comparative Example 1 | Layered product of sheets Comparative Example 2 | Granular activited carbon Comparative Example 3 |
|---|---|---|---|---|---|---|---|---|
| | Amount of filing | g | 3 | 3 | 3 | 3 | 3 | 25 |
| 0.2% N-butane | Effective adsorption-desorption amount per amount of filling | g | 0.25 | 0.21 | 0.18 | 0.15 | 0.15 | 0.21 |
| Density of layered product | | $g/cm^3$ | 0.031 | 0.036 | 0.044 | 0.055 | 0.065 | 0.47 |
| Container size | Length × width | cm | 3.8 × 3.8 | 3.8 × 3.8 | 3.8 × 3.8 | 3.8 × 3.8 | 3.8 × 3.8 | 3.8 × 3.8 |
| | Length | cm | 6.7 | 5.8 | 4.7 | 3.8 | 3.2 | 3.7 |
| | Volume | $cm^3$ | 96.8 | 83.3 | 68.2 | 54.5 | 46.2 | 53.2 |
| Pressure loss (when air is fed at 60 L/min) | | kPa | 0.32 | 0.59 | 0.21 | 0.90 | 2.03 | 0.71 |

[5] Amount of filling × (1 − moisture/100) × effective adsorption-desorption amount × 100 (g)

LIST OF REFERENCE SIGNS

1 ADSORPTIVE LAYERED PRODUCT
10 ACTIVATED CARBON FIBER SHEET
10a MAJOR SURFACE OF ACTIVATED CARBON FIBER SHEET
10b LATERAL END SURFACE OF ACTIVATED CARBON FIBER SHEET
10c LATERAL END FACE OF ACTIVATED CARBON FIBER SHEET
F FLOW DIRECTION OF GAS

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An activated carbon fiber sheet, comprising:
a specific surface area ranging from 1100 to 2300 $m^2/g$;
a density ranging from 0.010 to 0.200 $g/cm^3$;
a thickness ranging from 0.10 to 100.00 mm; and
a fiber size of 13.0 μm or larger,
wherein the activated carbon fiber sheet has a ratio $R_{0.7/2.0}$ equal to or more than 15% and less than 25%, the ratio $R_{0.7/2.0}$ being a ratio of a volume of pores having pore sizes of 0.7 nm or less to a volume of pores having pore sizes of 2.0 nm or less.

2. The activated carbon fiber sheet according to claim 1, wherein the activated carbon fiber sheet has a Frazier permeability ranging from 150.0 $cm^3/cm^2/s$ to 300 $cm^3/cm^2/s$.

3. The activated carbon fiber sheet according to claim 1, wherein the activated carbon fiber sheet has a total pore volume of 0.50 to 1.20 $cm^3/g$.

4. The activated carbon fiber sheet according to claim 1, wherein the activated carbon fiber sheet has a pore volume $V_{0.7-2.0}$ ranging from 0.20 to 1.20 $cm^3/g$, the pore volume $V_{0.7-2.0}$ being a volume of pores having a pore size larger than 0.7 nm and equal to or smaller than 2.0 nm.

5. An adsorptive layered product comprising:
a plurality of the activated carbon fiber sheets according to claim 1, wherein
the plurality of the activated carbon fiber sheets have been superposed on one another, and
the adsorptive layered product is to be stored in an adsorbent chamber of a motor vehicle canister.

6. A motor vehicle canister, comprising:
the activated carbon fiber sheet according to claim 1.

7. The motor vehicle canister according to claim 6, wherein
an adsorbent chamber of the motor vehicle canister has been filled with a layered product having a plurality of the activated carbon fiber sheets superposed on one another, and
the layered product is arranged such that a flow direction in which fluid passing through the layered product flows is approximately parallel to a major surface of the sheets.

8. The activated carbon fiber sheet according to claim 1, wherein the activated carbon fiber sheet is used for a motor vehicle canister.

9. The activated carbon fiber sheet according to claim 1, wherein the activated carbon fiber sheet is to be stored in a chamber of a motor vehicle canister.

10. The adsorptive layered product according to claim 5, wherein each of the activated carbon fiber sheets has a Frazier permeability ranging from 150.0 $cm^3/cm^2/s$ to 300 $cm^3/cm^2/s$.

11. The adsorptive layered product according to claim 5, wherein each of the activated carbon fiber sheets has a total pore volume of 0.50 to 1.20 $cm^3/g$.

12. The adsorptive layered product according to claim 5, wherein each of the activated carbon fiber sheets has a pore volume $V_{0.7-2.0}$ ranging from 0.20 to 1.20 $cm^3/g$, the pore volume $V_{0.7-2.0}$ being a volume of pores having a pore size larger than 0.7 nm and equal to or smaller than 2.0 nm.

* * * * *